Figure 1:
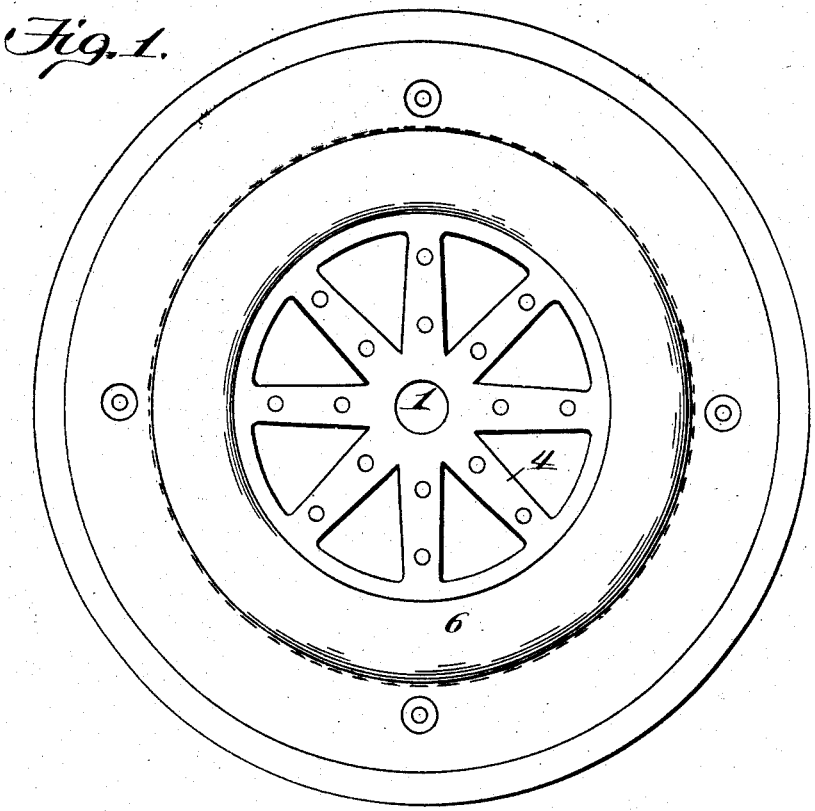

No. 878,592. PATENTED FEB. 11, 1908.
C. ADAMS-RANDALL.
WHEEL.
APPLICATION FILED FEB. 21, 1906.

Witnesses

Inventor
Charles Adams-Randall

UNITED STATES PATENT OFFICE.

CHARLES ADAMS-RANDALL, OF NEW YORK, N. Y.

WHEEL.

No. 878,592.   Specification of Letters Patent.   Patented Feb. 11, 1908.

Application filed February 21, 1906. Serial No. 302,312.

*To all whom it may concern:*

Be it known that I, CHARLES ADAMS-RANDALL, a citizen of the United States, residing at New York, in the county of New York and State of New York, have invented new and useful Improvements in Wheels, of which the following is a specification.

This invention relates to an improved wheel for self-propelled and other vehicles.

In the construction and use of self-propelled carriages, auto-cars and the like, it has been found necessary to have resilient, pliable, or elastically cushioned wheels to prevent excessive jolting of the occupants, and injury to or disarrangement of the working parts and machinery of the car.

Heretofore it has been customary and usual to have some form of pneumatic tire applied to the tire proper of a solid wheel. This has been found exceedingly costly, primarily, and also in maintenance, and besides, serious objections have arisen to this form of tire because of frequent puncturing and bursting of the same while in use, and also the tearing of the tire from the main part of the wheel by obstacles in the roadway, and in turning short corners at a high speed, such occurrences causing many accidents, fatal and otherwise, and damage to the cars as well as much delay and expense. Various means have been devised for protecting a pneumatic tire by outer covers of rubber, cloth, or leather, and with coverings of leather or other material provided with metal studs embedded in the material, or with metal rivets passing through such material. These devices, however, while having some advantages, are far from perfect and add to the cost, maintenance and weight, besides being very ungainly in appearance.

The object of this invention is to overcome these objections, all and several, and to produce a cheap, reliable, safe, neat, practically resilient wheel to take the place of the exposed, external, dangerous and unsatisfactory pneumatic tire.

To this end, the invention consists generally in the construction of a compound wheel having two main portions or parts, one external to the other, with a suitable pneumatic cushion or cushions intermediary, with simple mechanical means for connecting the same in a yielding manner to cause them to revolve together, though the relative positions of corresponding radial parts of the two rims may change as the conditions of the roadway may require, so as to produce a spring-like resilient action of the wheel between the hub and outer tire to prevent excessive jolting and other disadvantages. Under this general construction, all of the resiliency or pliability of the use of a pneumatic tire is obtained, and the pneumatic cushion, under the present improved construction, is protected from undue wear and tear, and also from all possibility of puncturing, bursting, or accidental removal from the wheel, and the consequent danger and trouble resulting therefrom, and the primary cost and expense of maintenance are materially reduced.

Figure 2:
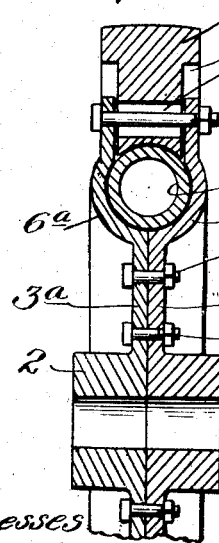
Figure 3:
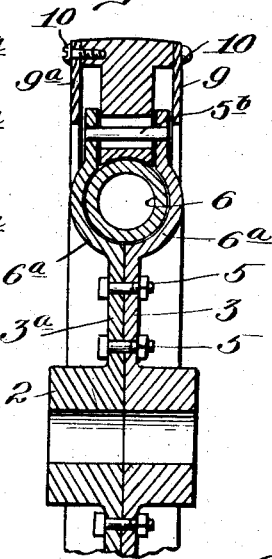
Figure 4:
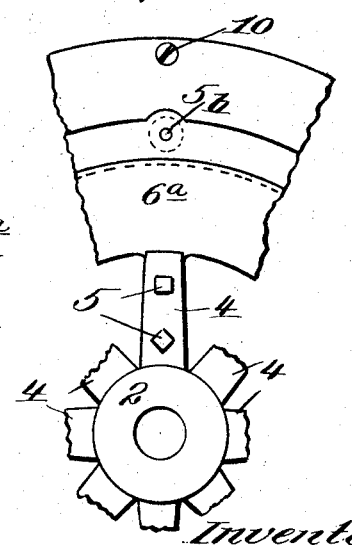

Various forms of construction are possible under this general arrangement, as specified, but for the purpose of practically demonstrating the invention, the accompanying drawings illustrate the preferred forms, and therein:

Figure 1 is a side elevation of a wheel embodying the features of the invention, one of the hub members having been removed. Fig. 2 is a transverse vertical section through the center of a portion of the wheel. Fig. 3 is a transverse vertical section similar to that illustrated by Fig. 4 showing a modification. Fig. 4 is a side elevation of a portion of the wheel shown by Fig. 3.

Similar numerals of reference are employed to indicate corresponding parts in the several views.

The numeral 1, Fig. 1, represents the axle upon which the central portion or hub 2 of the wheel is rigidly or loosely secured in any of the well known ways. This central portion or hub 2 is composed of two separate members 3 and 3ª, Figs. 2 and 3, and preferably formed with spokes 4, which are fastened together by bolts, screws or other analogous devices 5; and when secured they provide means for holding a pneumatic cushion 6 in normal position, and also the freely movable outer rim or tire 7, which may be made of any suitable material, the tire 7 having bolts 5ª passing through suitable bolt holes 8, formed in said tire and also through coinciding bolt openings in the outer extremities of the members 3—3ª. The pneumatic cushion 6, when properly inflated, acts to hold the tire 7 in normal position relatively to the central portion or hub 2 of the wheel, and during such normal condition the bolts 5ª are located in the center of the holes 8, the latter being of considerably greater diameter than the bolts to permit play, and when an increase of pressure is imposed on the tire 7 and the hub 2, or a pressure in excess of the normal weight of the carriage and its load, the pneumatic cushion is compressed or yields, and the hub moves relatively to such increased weight and gives to the wheel a resilient action and obviates inconvenient jolting when passing over irregularities on the roadway. The tire 7 is recessed, as at 7ª, to avoid interference with the outer extremities of the members 3 and 3ª, and the latter at the point of location of the cushion 6 are curved outwardly, as at 6ª, to provide a proper seat for the cushion. The inner edge of the tire 7 contacts directly with the cushion 6, as clearly shown by Fig. 2. The parts may be readily assembled or disassociated through the medium of the removable bolts and nuts or other analogous fastenings 5, which engage the spokes 4.

When all the parts of the improved wheel are properly assembled, the pneumatic cushion 6 will be fully shielded and covered, thus increasing its wearing qualities and durability, and in view of the fact that the said pneumatic cushion does not contact with the bed of the roadway or other surface over which the wheel has movement, there will be no liability of puncturing such cushion, with material advantages in wheel structures of the class set forth.

Figs. 3 and 4 illustrate a slight modification of the wheel, and said modification consists of annular plates 9, 9ª, of approximately the same diameter as the rim 7, the said plates being secured to the rim by screws or other suitable fastenings 10, and thus caused to move with the rim. These plates have free movement over the outer surfaces of the spokes 4 of the hub 2, and are preferably made of steel. These annular plates give additional strength to the wheel and afford protection to the moving parts and prevent, to a large extent, the injurious effect of dust and dirt thereon. In this instance, the bolts or connecting devices 5ᵇ corresponding to the bolts 5ª, heretofore described, have their ends held within the outer extremities of the spokes 4, but this arrangement is approximately the same as that illustrated by Fig. 2.

In the forms of the wheel set forth, the usual means for inflating will be provided, though not shown. While the foregoing forms of the wheel are preferred and will, no doubt, be used more extensively than other arrangements embodying the same principle, it will be understood that modifications may be adopted without sacrificing the essential features, which consist of a wheel having movable parts coöperating with a cushion sealed or covered within the body of the wheel and receiving the excessive weight pressure or abnormal weight imposed upon the wheel, with a resilient or cushioning effect to avoid the transmission of sudden jolts or unpleasant vibrations to the occupants of an auto-car or other vehicle on which the wheel may be used. It is also proposed, when found necessary, to use tractive projections on the rim portions of the wheel.

Having thus described the invention, what is claimed, is:

1. In a resilient wheel, the combination of a hub and spoke portion constructed in two halves and immovably secured together, the outer edges of the halves of the hub and spoke portion being free and opening into a seat at a distance inwardly between the same and the hub members, a pliable inflatable air cushion disposed in the seat, an independent outer tire or traction device having a portion movably extending inwardly between the outer free edges of the halves of the hub and spoke portion and resting on the outer part of the cushion, and means fixed to the free open edges of the two halves and extending transversely across said edges, the inner portion of the tire or traction device being movable on the said means.

2. In a resilient wheel, the combination of a hub and spoke portion constructed in two halves and having means for immovably securing the same together and having a seat near the free open edges thereof, a pliable inflatable air cushion disposed in said seat and inclosed by the halves of the spoke portion in which the said seat is formed, an outer independent tire or traction device surrounding the hub and spoke portion and having an inwardly projecting part movably engaging the space between the outer free edges of the said halves and resting on the cushion, the said inwardly projecting part being transversely slotted, and means fixed to the outer free edges of the two halves and extending transversely through the slots of the inwardly projecting part of the tire or traction device.

3. In a resilient wheel, the combination of a hub and spoke portion constructed in two halves and having means for immovably securing the same together and having a seat near the free open edges thereof, a pliable inflatable air cushion disposed in said seat and inclosed by the halves of the spoke portion in which the said seat is formed, an outer independent tire or traction device surrounding the hub and spoke portion and having an inwardly projecting part movably engaging the space between the outer free edges of the said halves and resting on the cushion, the said inwardly projecting part being transversely slotted, means fixed to the outer free edges of the two halves and extending transversely through the slots of the inwardly projecting part of the tire or traction device, and an annular plate fixed to the tire or traction device and movably projecting inwardly over and bearing upon the outer sides of the free ends of the halves of the hub and spoke portion.

4. In a resilient wheel, a hub and spoke section constructed in two halves which are immovably secured together, an inclosed seat being formed in the two halves inwardly a distance from the outer free edges of the two halves of the hub and spoke section, a pliable inflatable air cushion disposed in the said seat, an independent outer tire or tread device surrounding the hub and spoke section and movably fitted between the two halves of the latter outside of and bearing on the air cushion and formed with recesses in the opposite outer side portions thereof in which the outer free edges of the halves of the section are movable, and connecting rods fixed in the outer free edges of the two halves of the hub and spoke section and loosely engaged by the inner portion of the tire or tread device.

In testimony whereof I have hereunto set my hand in presence of two subscribing witnesses.

CHARLES ADAMS-RANDALL.

Witnesses:
    D. D. LOVELACE,
    C. S. RICHMAN.